United States Patent
Phillips

(10) Patent No.: US 6,835,499 B2
(45) Date of Patent: Dec. 28, 2004

(54) NEGATIVE ELECTRODE FORMULATION FOR A LOW TOXICITY ZINC ELECTRODE HAVING ADDITIVES WITH REDOX POTENTIALS POSITIVE TO ZINC POTENTIAL

(75) Inventor: Jeffrey Phillips, Santa Clara, CA (US)

(73) Assignee: PowerGenix, Systems, Inc., Yukon (CA)

(*) Notice: Subject to any disclaimer, the term of this patent is extended or adjusted under 35 U.S.C. 154(b) by 34 days.

(21) Appl. No.: 10/429,712

(22) Filed: May 6, 2003

(65) Prior Publication Data

US 2003/0186127 A1 Oct. 2, 2003

Related U.S. Application Data

(63) Continuation of application No. PCT/CA01/01715, filed on Nov. 7, 2001.

(30) Foreign Application Priority Data

Nov. 10, 2000 (CA) .............................................. 2325791

(51) Int. Cl.[7] .............................................. H01M 4/48
(52) U.S. Cl. ........................ 429/231; 429/229; 429/232; 429/206; 429/207
(58) Field of Search ................................ 429/231, 229, 429/232, 206, 207

(56) References Cited

U.S. PATENT DOCUMENTS

| | | |
|---|---|---|
| 3,870,564 A | 3/1975 | Takamura et al. |
| 3,951,687 A | 4/1976 | Takamura et al. |
| 4,017,665 A * | 4/1977 | Sandera et al. ............. 429/229 |
| 4,037,033 A * | 7/1977 | Takamura et al. .......... 429/206 |
| 4,304,828 A * | 12/1981 | Vaidyanathan .............. 429/206 |
| 5,215,836 A | 6/1993 | Eisenberg |

FOREIGN PATENT DOCUMENTS

| | | |
|---|---|---|
| EP | 0457354 | 11/1991 |
| EP | 0697746 | 2/1996 |
| EP | 0833397 | 4/1998 |

* cited by examiner

Primary Examiner—Laura Weiner
(74) Attorney, Agent, or Firm—Beyer Weaver & Thomas, LLP

(57) ABSTRACT

A zinc electrode composition is provided for use in low toxicity, high energy density cells having alkaline electrolytes. The zinc electrode comprises zinc oxide, a binder, and from 0.1% up to 10% of a fluoride of an element chosen from the group consisting of silver, gallium, indium, tin, tellurium, lead, bismuth, and combinations thereof. The invention also provides an electrochemical cell having an electrode as noted above. The inventive cell further comprises an electrolyte which contains a mixture of sodium, potassium, and lithium hydroxides, together with boric acid. The excess alkali hydroxide is present in the range of 2.7 to 5M, and the concentration of boric acid is between 0.6 and 1.3 moles per liter.

4 Claims, No Drawings

NEGATIVE ELECTRODE FORMULATION FOR A LOW TOXICITY ZINC ELECTRODE HAVING ADDITIVES WITH REDOX POTENTIALS POSITIVE TO ZINC POTENTIAL

This is a continuation of PCT/CA01/01715, filed Nov. 7, 2001.

FIELD OF THE INVENTION

This invention relates to alkaline galvanic cells having zinc electrodes and an alkaline electrolyte. More particularly, the present invention relates to high energy density rechargeable cells having a zinc or zinc-based negative electrodes, an alkaline electrolyte, and positive electrodes which may be nickel, silver, air, or iron.

BACKGROUND OF THE INVENTION

The provision of rechargeable zinc batteries having alkaline electrolytes is well known. Leaving aside the question of zinc/manganese dioxide cells, which find dominance in commercial fields supplying cells (batteries) for use in flashlights, toys, low drainage devices such as electric clocks, and the like, there is also a very large market and requirement for high energy density, high capacity cells and batteries such as nickel-zinc, silver-zinc, and zinc-air batteries, as well as a recently introduced super iron-zinc battery. A requirement is, however, that such cells and batteries must be cycled many times through discharge/charge cycles; leading in turn to several further requirements. The first is that the capacity of the rechargeable cell should not diminish significantly over a number of cycles, there should be no significant shape change—particularly of the zinc electrode—and no significant dendrite formation. Most especially, newly developed high energy density rechargeable zinc cells should be free or substantially free of toxicity, so as to be environmentally benign. This means, in particularly, that a robust, long-lasting, rechargeable battery must be brought to the market which contains no cadmium, no lead, and no mercury.

In the following discussion, the terms "cell" and "battery" may be used interchangeably. Of course, it is recognized that a cell comprises two electrodes, one positive and one negative, and an electrolyte; and a battery may comprise a number of cells which are joined together in series, parallel, or series/parallel. In many batteries, of course, there are a plurality of negative and positive plates and a common electrolyte all contained in a single casing; and in some cases, the plates may be bipolar. In other batteries, there may be a plurality of self-contained cells, each having their own positive and negative electrodes and electrolyte. Moreover, cells and batteries may be cylindrical or rectangular, they may comprise flat plates or rolled plates, and they may have a relatively low voltage of one or two volts. Batteries may have a relatively high voltage, in the range of twelve to sixteen volts, sometimes much higher. The present invention applies to any of the above considerations in respect of cells and batteries, as it relates to the structure of the electrodes.

Batteries in keeping with the present invention will find particular utility in traction markets, being used on scooters and bicycles, as well as in hybrid automobiles, and in the power tool market. In such markets, there is a very great necessity for sealed battery systems, which have high energy density and, therefore, relatively low weight per amp-hour unit capacity, as well as low cost per amp-hour unit capacity. Moreover, batteries in keeping with the present invention will provide high amp-hour capacity per unit volume.

A particular feature of the present invention is that long life, rechargeable zinc electrodes may be supplied which can be manufactured using equipment that is presently used for nickel cadmium or nickel metal-hydride production. Typically, electrodes which embody the present invention are pasted on a high conductivity, low resistance matrix or carrier, which might conveniently be manufactured from copper and/or suitable alloys thereof.

In order to minimize shape change and dendrite growth, and to provide a stable construction so as to achieve prolonged cycle life, high power over the life of the battery, and maximum energy density, careful choice must be made of the combination of the zinc electrode and the electrolyte for the battery.

Typically, batteries in keeping with the present invention employ a buffered borate electrolyte which is particularly such as that which is taught in EISENBERG U.S. Pat. No. 5,215,836, issued Jun. 1, 1993. That patent teaches alkaline galvanic cells having an electrolyte composition which comprises a solution of a salt formed by reacting boric acid (or, alternatively, phosphoric acid or arsenic acid) with an alkali or earth alkali hydroxide which is present in a sufficient amount to produce a stoichiometric excess of hydroxide to acid in the range of 2.5 to 11.0 equivalents per liter. As well, a soluble alkali or earth or earth alkali fluoride is present, in an amount corresponding to a concentration range of 0.01 to 1.0 equivalents per liter of total solution.

By suitable zinc formulation, as taught hereafter, together with use of the buffered borate electrolyte, degradation mechanisms that operate during cycling are inhibited.

DESCRIPTION OF THE PRIOR ART

The performance of rechargeable zinc electrodes in alkaline electrolytes has been the subject of many studies that encompass the zinc electrode composition and the interaction with the electrolyte. A performance inhibiting disfigurement of the zinc electrode occurs as cycling progresses. The most obvious effect is a lower than acceptable amp-hour capacity delivered at useable voltages. This tendency has been arrested by a number of approaches. The combination of more dilute potassium hydroxide electrolyte together with the addition of calcium hydroxide to the zinc electrode appears to be particularly effective (U.S. Pat. No. 4,358,517 issued Nov. 9, 1982 to JONES). Alternate approaches have used buffered electrolytes with and without fluoride additions that have also resulted in increased zinc electrode life span. Noteworthy among these approaches is that described in U.S. Pat. No. 5,453,336 issued Sep. 26, 1995 to ADLER et al. which teaches a mixture of alkaline electrolyte (2–12M) combined with a carbonate of 0.5–4M and a fluoride of 0.5–4M is particularly effective. U.S. Pat. No. 4,273,841 issued Jun. 16, 1981 to CARLSON describes another mixture that employs 5–10% hydroxide, 10–20% phosphate and 5–15% fluoride. EISENBERG describes two electrolyte formulations in U.S. Pat. No. 4,224,391 issued Sep. 23, 1980 and U.S. Pat. No. 5,215,836 issued Jun. 1, 1993. Both employ mixtures of potassium hydroxide and boric, phosphoric or arsenic acid. However the latter patent describes advantages of alkali fluorides in the range of 0.01 to 1 M. This should be implemented in combination with a more alkaline electrolyte.

Electrode additions of numerous oxide additives have been investigated and proved to be beneficial (U.S. Pat. No. 5,556,720 issued Sep. 17, 1996 to CHARKEY and U.S. Pat. No. 4,084,047 issued Apr. 11, 1978 to HIMY et al.). Some oxides are claimed to result in a conductive metal matrix that enhances electrode conductivity; others may result in the formation of beneficial alloys and a reduction in hydrogen evolution. Zinc fluoride and zinc titanate (U.S. Pat. No. 4,304,828 issued Dec. 8, 1981 to VAIDYANATHAN) and the direct additions of alkali fluoride to the zinc electrode have also been found beneficial (U.S. Pat. No. 4,017,665 issued Apr. 12, 1977 to SANDERA et al.).

It should also be noted that lead, cadmium, and mercury oxides are particularly favoured as electrode enhancement additives. However, these oxides impart a toxicity to the electrode that is undesirable—and, in some instances, unacceptable.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

Additions to the zinc oxide electrode of fluorides from the elements of Group 1b, group 3a, and group 4a with redox potentials positive of the zinc potential are expected to significantly improve the performance of the fully formed electrode by complexing the zinc and preventing migration. The specific elements covered by the invention are those with medium to high hydrogen over-voltage. These include silver, gallium, indium, tellurium, tin, lead and bismuth. A typical electrode composition contains between 0.1 and 10% of the fluoride additive. The electrode also contains between 2–10% bismuth oxide. These oxide and fluoride materials may contain zinc metal, but in most cases consist of the additive materials and zinc oxide.

The mixture is pasted onto a suitable substrate and combined with separators and positive electrode into an electrochemical cell. Commonly, the positive electrode will be a nickel oxide to define a nickel-zinc cell; however, this invention can equally well apply to any rechargeable zinc containing battery. After the assembly of the battery, the electrolyte is added and a formation charge is applied to convert the zinc oxide to zinc metal. Normally, over 100% of the rated capacity is input during the formation process.

The electrolyte of preference to work optimally with this electrode is a mixture of sodium, potassium, and lithium hydroxides, and boric or phosphoric acid. The boric acid concentration is required to be 0.6 to 1.3 moles per liter. The stoichiometric excess of alkali hydroxide is between 2.7 and 5M. The alkaline mixture must contain between 0.1 and 3M lithium hydroxide. While this electrolyte is preferred, other mixtures can also be used. However, it has been found that electrolytes with even a modest fluoride content are incompatible with lithium hydroxide additions.

Other modifications and alterations may be used in the design and manufacture of the apparatus of the present invention without departing from the spirit and scope of the accompanying claims.

What is claimed is:

1. A zinc electrode composition for use in low toxicity, high energy density cells having alkaline electrolytes, wherein the electrode composition comprises zinc oxide, a binder, and from 0.1% up to 10% of a fluoride of an element chosen from the group consisting of silver, gallium, indium, tin, tellurium, lead, bismuth, and combinations thereof.

2. The zinc electrode composition of claim 1, wherein the electrode composition further comprises from 1% up to 10% bismuth oxide.

3. An electrochemical cell having an electrode comprising the composition as taught in claim 1 or claim 2, said cell further comprising an electrolyte which contains a mixture of sodium, potassium, and lithium hydroxides, together with boric acid;

wherein the excess alkali hydroxide is present in the range of 2.7 to 5M, and the concentration of boric acid is between 0.6 and 1.3 moles per liter.

4. The electrochemical a cell of claim 3, wherein the electrolyte comprises lithium ion in a concentration of between 0.1 and 3 molar.

* * * * *